United States Patent
Ahn et al.

(10) Patent No.: US 9,143,285 B2
(45) Date of Patent: *Sep. 22, 2015

(54) METHOD AND APPARATUS OF TRANSMITTING ACK/NACK

(71) Applicant: LG ELECTRONICS INC., Seoul (KR)

(72) Inventors: Joon Kui Ahn, Anyang-si (KR); Jung Hoon Lee, Anyang-si (KR); Suck Chel Yang, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/563,724

(22) Filed: Dec. 8, 2014

(65) Prior Publication Data
US 2015/0092723 A1    Apr. 2, 2015

Related U.S. Application Data

(63) Continuation of application No. 13/147,812, filed as application No. PCT/KR2010/001814 on Mar. 24, 2010, now Pat. No. 8,929,308.

(60) Provisional application No. 61/163,442, filed on Mar. 25, 2009.

(30) Foreign Application Priority Data

Mar. 10, 2010 (KR) .................. 10-2010-0021097

(51) Int. Cl.
*H04W 4/00* (2009.01)
*H04L 1/18* (2006.01)
*H04L 1/16* (2006.01)
(Continued)

(52) U.S. Cl.
CPC ............ *H04L 1/1893* (2013.01); *H04L 1/1607* (2013.01); *H04L 1/1861* (2013.01); *H04L 5/0053* (2013.01); *H04W 72/1284* (2013.01)

(58) Field of Classification Search
None
See application file for complete search history.

(56) References Cited

U.S. PATENT DOCUMENTS

| | | |
|---|---|---|
| 2008/0056179 A1 | 3/2008 | Kim et al. |
| 2008/0170634 A1 | 7/2008 | Kwak et al. |
| 2008/0212506 A1 | 9/2008 | Lee et al. |

(Continued)

FOREIGN PATENT DOCUMENTS

| | | |
|---|---|---|
| KR | 10-2008-0051189 A | 6/2008 |
| KR | 10-2008-0065560 A | 7/2008 |

(Continued)

*Primary Examiner* — Chirag Shah
*Assistant Examiner* — Suk Jin Kang
(74) *Attorney, Agent, or Firm* — Birch, Stewart, Kolasch & Birch, LLP

(57) ABSTRACT

A method for transmitting an uplink signal by a user equipment (UE) in a wireless communication system. The method according to one embodiment includes receiving, by the UE, a physical downlink control channel (PDCCH) via one or more resource units; receiving, by the UE, a physical downlink shared channel (PDSCH) indicated by the received PDCCH; and transmitting, by the UE, a physical uplink control channel (PUCCH) using a PUCCH resource in response to the received PDSCH. An index of the PUCCH resource is determined by adding a first index offset and a second index offset to a lowest index of the one or more resource units. The first index offset is signaled via the PDCCH and the second index offset is signaled via higher layer signaling.

12 Claims, 12 Drawing Sheets

(51) Int. Cl.
*H04L 5/00* (2006.01)
*H04W 72/12* (2009.01)

(56) References Cited

U.S. PATENT DOCUMENTS

| | | |
|---|---|---|
| 2008/0273513 A1 | 11/2008 | Montojo et al. |
| 2008/0293424 A1 | 11/2008 | Cho et al. |
| 2008/0311942 A1 | 12/2008 | Kim et al. |
| 2009/0097447 A1 | 4/2009 | Han et al. |
| 2009/0196240 A1 | 8/2009 | Frederiksen et al. |
| 2009/0201863 A1 | 8/2009 | Pi |
| 2009/0207793 A1* | 8/2009 | Shen et al. .................... 370/329 |
| 2009/0257449 A1 | 10/2009 | Chen et al. |
| 2010/0040009 A1 | 2/2010 | Gaal et al. |
| 2010/0118798 A1 | 5/2010 | Chun et al. |
| 2010/0172290 A1 | 7/2010 | Nam et al. |
| 2010/0172308 A1* | 7/2010 | Nam et al. .................... 370/329 |
| 2010/0195629 A1 | 8/2010 | Chen et al. |
| 2010/0232373 A1 | 9/2010 | Nory et al. |
| 2010/0248765 A1 | 9/2010 | Chun et al. |
| 2010/0303011 A1 | 12/2010 | Pan et al. |
| 2010/0322114 A1 | 12/2010 | Li et al. |
| 2011/0199997 A1 | 8/2011 | Wennstrom et al. |
| 2011/0211538 A1 | 9/2011 | Kakura |
| 2011/0299490 A1 | 12/2011 | Nordstrom et al. |
| 2012/0026966 A1 | 2/2012 | Wennstrom et al. |
| 2012/0051310 A1 | 3/2012 | Cho et al. |
| 2012/0099546 A1* | 4/2012 | Cho et al. ...................... 370/329 |
| 2012/0263143 A1 | 10/2012 | Han et al. |
| 2013/0195039 A1 | 8/2013 | Pan et al. |

FOREIGN PATENT DOCUMENTS

| | | |
|---|---|---|
| KR | 10-2008-0086399 A | 9/2008 |
| KR | 10-2009-0020518 A | 2/2009 |
| WO | WO 2007/044414 A1 | 4/2007 |

* cited by examiner

PUCCH format 1a and 1b structure (normal CP case)

METHOD AND APPARATUS OF TRANSMITTING ACK/NACK

CROSS-REFERENCE TO RELATED APPLICATIONS

This application is a continuation of co-pending U.S. patent application Ser. No. 13/147,812 filed on Aug. 4, 2011, which is the national phase of PCT International Application No. PCT/KR2010/001814 filed on Mar. 24, 2010, which claims the benefit of U.S. Provisional Application No. 61/163,442 filed on Mar. 25, 2009, and Korean patent application No. 10-2010-0021097 filed on Mar. 10, 2010. The entire contents of all of the above applications are hereby incorporated by reference.

BACKGROUND OF THE INVENTION

1. Field of the Invention

The present invention relates to a wireless communication system. And, more particularly, the present invention relates to a method and apparatus of transmitting ACK/NACK.

2. Discussion of the Related Art

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier-frequency division multiple access (MC-FDMA) system.

If a wireless communication system transmits a data unit (e.g., packet), a receiver should notify the success or failure of the data unit reception to a transmitter. If the data unit reception is successful, an ACK (acknowledgement) is transmitted, so that the transmitter can transmit a new data unit, and if the data unit reception is unsuccessful (or failed), a NACK (Negative-ACK) is transmitted, so that the transmitter retransmits the corresponding data unit. Such operation is referred to as an ARQ (Automatic Repeat reQuest). An HARQ (hybrid ARQ) is a method consisting of a combination of the ARQ and channel coding. The HARQ may combine a retransmitted data unit with an already-received data unit, thereby reducing an error rate. In the HARQ, the ACK/NACK (A/N) is transmitted by using a physical channel signaling method. The method for realizing the HARQ may broadly include a Chase Combining (CC) method and an Incremental Redundancy (IR) method.

SUMMARY OF THE INVENTION

The present invention is devised to provide a method and apparatus of transmitting ACK/NACK (Acknowledgement/Negative-ACK) signals in a wireless communication system. More specifically, the present invention relates to a method and apparatus of efficiently assigning resources for transmitting ACK/NACK signals in a wireless communication system. The technical objectives that are to be realized by the present invention will not be limited only to the technical objects pointed out herein. Other technical objectives that have not yet been mentioned herein will become apparent to those having ordinary skill in the art upon examination of the following or may be learned from practice of the invention.

In an aspect of the present invention, provided herein is a method of transmitting an ACK/NACK (Acknowledgement/Negative-ACK) signal at a user equipment in a wireless communication system, the method including: receiving a first downlink control channel from a base station; receiving scheduling information through a second downlink control channel from the base station; deciding an uplink resource index for transmitting an ACK/NACK signal associated with the scheduling by considering the first control channel when the first control channel has a predetermined format; and transmitting the ACK/NACK signal to the base station by using an uplink resource indicated by the uplink resource index.

In another aspect of the present invention, provided herein is a user equipment including an RF (Radio Frequency) unit configured to transmit and receive wireless (or radio) signals to and from a base station; a memory for storing information transmitted and received to and from the base station and parameters required for operations of the user equipment; and a processor being connected to the RF unit and the memory and being configured to control the RF unit and the memory, wherein the processor is configured to perform receiving a first downlink control channel from a base station; receiving scheduling information through a second downlink control channel from the base station; deciding an uplink resource index for transmitting an ACK/NACK signal associated with the scheduling by considering the first control channel when the first control channel has a predetermined format; and transmitting the ACK/NACK signal to the base station by using an uplink resource indicated by the uplink resource index.

Whether or not the first downlink control channel has the predetermined format may be determined based upon a structure of the first downlink control channel (e.g., length of DCI (Downlink Control Information)). Also, whether or not the first downlink control channel has a predetermined format may be determined based upon information carried by the first downlink control channel (e.g., contents of DCI (Downlink Control Information)). In this case, when the first downlink control channel has a predetermined format, the first downlink control channel may carry a null (e.g., predefined '0's or '1's) value. Furthermore, whether or not the first downlink control channel has a predetermined format may be determined based upon a masking code or scrambling code applied to the first downlink control channel. Finally, when the first downlink control channel has a predetermined format, the first downlink control channel may be configured of 1 CCE (Control Channel Element).

In another aspect of the present invention, provided herein is a method of transmitting an ACK/NACK (Acknowledgement/Negative-ACK) signal at a user equipment in a wireless communication system, the method including: receiving scheduling information from a base station through a downlink control channel; receiving a data unit from the base station through a downlink shared channel based upon the scheduling information; deciding an uplink resource index for transmitting an ACK/NACK signal with respect to the data unit by using a resource index configuring the downlink control channel and by using index modification information associated with the downlink control channel; and transmitting the ACK/NACK signal to the base station by using an uplink resource indicated by the uplink resource index.

In a further aspect of the present invention, provided herein is a user equipment including an RF (Radio Frequency) unit configured to transmit and receive wireless (or radio) signals to and from a base station; a memory for storing information transmitted and received to and from the base station and parameters required for operations of the user equipment; and a processor being connected to the RF unit and the memory and being configured to control the RF unit and the memory, wherein the processor is configured to perform receiving scheduling information from a base station through a downlink control channel; receiving a data unit from the base station through a downlink shared channel based upon the scheduling information; deciding an uplink resource index for transmitting an ACK/NACK signal with respect to the data unit by using a resource index configuring the downlink control channel and by using index modification information associated with the downlink control channel; and transmitting the ACK/NACK signal to the base station by using an uplink resource indicated by the uplink resource index.

The downlink control channel may include a PDCCH (Physical Downlink Control Channel), and the uplink resources may include a PUCCH (Physical Uplink Control Channel) resource. Also, the resource index used for deciding the uplink resource may include a first index among resource indexes configuring the downlink control channel.

The index modification information may include an (absolute/relative) offset value. And, the index modification information may be included in a DCI (Downlink Control Information) of the downlink control channel. Additionally, the index modification information may be verified by using a masking code or scrambling code applied to the downlink control channel. Furthermore, the index modification information may be identified by using information of a subframe through which the downlink control channel is received or by using information of a component carrier.

The downlink control channel may be received through a downlink subframe that is not paired with an uplink subframe in which the ACK/NACK signal is transmitted. And, the downlink control channel may be received through a downlink subframe that is paired with an uplink subframe for backhaul communication.

According to the embodiments of the present invention, in a wireless communication system, the ACK/NACK signals may be efficiently transmitted. More specifically, in a wireless communication system, resources for transmitting the ACK/NACK signals may be efficiently assigned (or allocated).

The effects that can be achieved in the present invention will not be limited only to the effects pointed out in the description of the present invention. Other effects that have not yet been mentioned herein will become apparent to those having ordinary skill in the art upon examination of the following or may be learned from practice of the invention.

BRIEF DESCRIPTION OF THE DRAWINGS

The accompanying drawings, which are included to provide a further understanding of the invention and are incorporated in and constitute a part of this application, illustrate embodiments of the invention and along with the description serve to explain the spirit and scope (or principle) of the invention.

DETAILED DESCRIPTION OF THE INVENTION

Hereinafter, structures, operations, and other features of the present invention will be understood readily by the preferred embodiments of the present invention, examples of which are illustrated in the accompanying drawings. The embodiments of the present invention can be used for various wireless access technologies such as CDMA, FDMA, TDMA, OFDMA, SC-FDMA, and MC-FDMA. The CDMA can be implemented by wireless technology such as universal terrestrial radio access (UTRA) or CDMA2000. The TDMA can be implemented by wireless technology such as global system for mobile communications (GSM)/general packet radio service (GPRS)/enhanced data rates for GSM evolution (EDGE). OFDMA can be implemented by wireless technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) communication system is a part of an evolved UMTS (E-UMTS) that uses E-UTRA. LTE-advanced (LTE-A) is an evolved version of the 3GPP LTE.

The following embodiments will be described based on that technical features of the present invention are applied to the 3GPP system. However, it is to be understood that the 3GPP system is only exemplary and the present invention is not limited to the 3GPP system.

Figure 1:
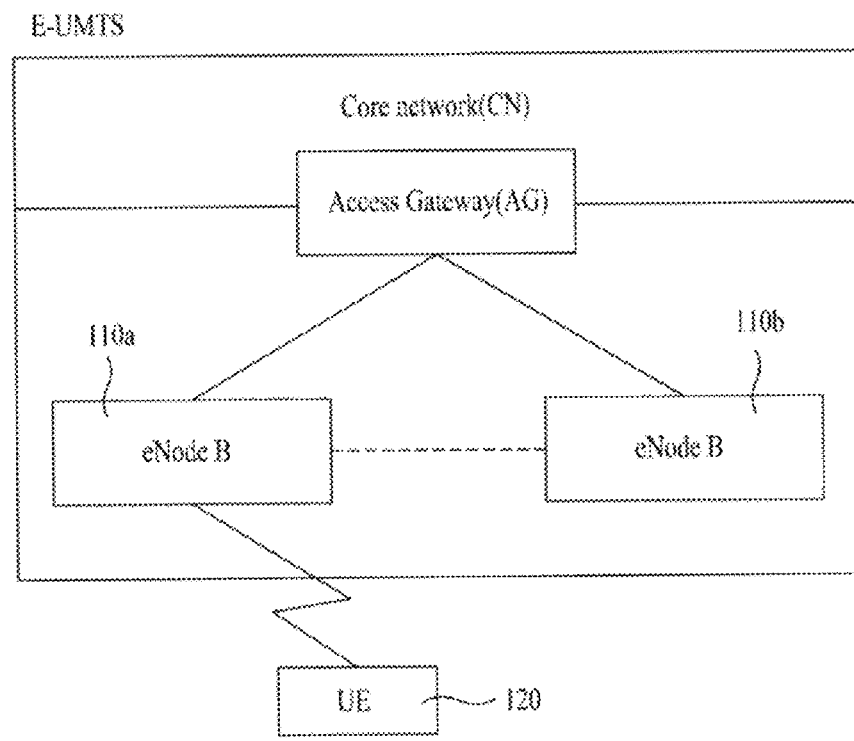
FIG. 1 illustrates a network structure of an E-UMTS (Evolved Universal Mobile Telecommunications System).

FIG. 1 is a diagram illustrating a network structure of an Evolved Universal Mobile Telecommunications System (E-UMTS). The E-UMTS may be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. Generally, the base stations can simultaneously transmit multiple data streams for a broadcast service, a multicast service and/or a unicast service. One or more cells may exist for one base station. One cell is set to one of bandwidths of 1.25, 2.5, 5, 10, and 20 Mhz. Different cells may be set to provide different bandwidths. Also, one base station controls data transmission and reception for a plurality of user equipments. The base station transmits downlink (DL) scheduling information of downlink data to a corresponding user equipment to notify the corresponding user equipment of time and frequency domains to which data will be transmitted and information related to encoding, data size, hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, HIARQ. A Core Network (CN) may include the AG and a network node for user registration of the UE. The AG manages mobility of a UE on a Tracking Area (TA) basis, wherein one TA includes a plurality of cells.

Figure 2:
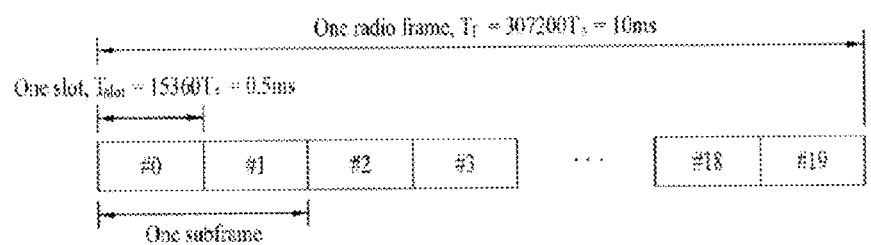
FIG. 2 illustrates an exemplary wireless frame structure used in an LTE.
Figure 3:
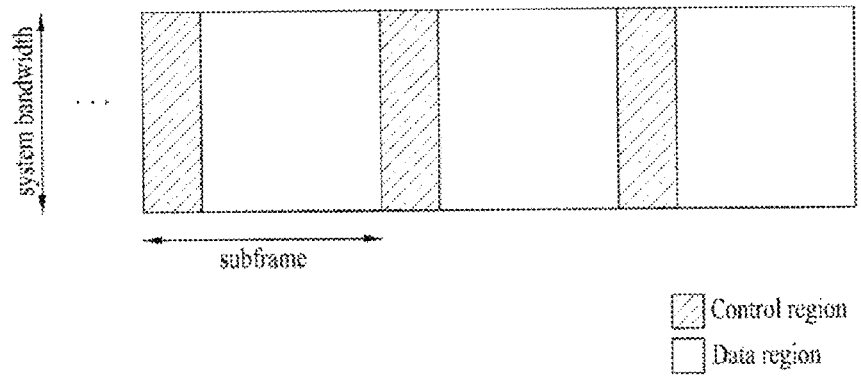
FIG. 3 illustrates an exemplary downlink subframe structure used in an LTE.

FIG. 2 is a diagram illustrating a structure of a radio frame used in the LTE system. Referring to FIG. 2, the radio frame has a length of 10 ms($327200*T_s$) and includes 10 subframes of an equal size. Each sub frame has a length of 1 ms and includes two slots. Each slot has a length of 0.5 ms($15360*T_s$). In this case, $T_s$ represents a sampling time, and is expressed by $T_s=1/(15\ kHz*2048)=3.2552*10^{-8}$ (about 33 ns). The slot includes a plurality of OFDMA (or SC-FDMA) symbols in a time domain, and includes a plurality of resource blocks (RBs) in a frequency domain. In the LTE system, one resource block includes twelve (12) subcarriers*seven (or six) OFDMA (or SC-FDMA) symbols. A transmission time interval (TTI) which is a transmission unit time of data can be determined in a unit of one or more subframes. The aforementioned structure of the radio frame is only exemplary, and various modifications can be made in the number of subframes included in the radio frame or the number of slots included in the subframe, or the number of OFDMA (or SC-FDMA) symbols included in the slot. FIG. 3 illustrates an exemplary downlink subframe structure used in an LTE.

Referring to FIG. 3, a downlink wireless frame includes 10 subframes each having the same length. In a 3GPP ITE system, a subframe is defined as a basic time unit for packet scheduling with respect to an overall downlink frequency. Each subframe is divided into scheduling information, and a time section for transmitting other control information (control region) and a time section for transmitting downlink data (data region). The control region starts from a first OFDM symbol of a subframe and includes at least one or more OFDM symbols. The size of the control region may be independently set-up (or determined) for each subframe. The control region is used for transmitting L1/L2 (layer 1/layer 2) control signals. The data region is used for transmitting downlink traffic. Control channels being assigned to the control region include PCFICH (Physical Control Format Indicator CHannel), PHICH (Physical Hybrid-ARQ Indicator CHannel) and PDCCH (Physical Downlink Control CHannel).

The PDCCH corresponds to a physical downlink control channel, which is assigned to the first n number of OFDM symbols of a subframe. Herein, n is an integer more than or equal to 1, which is indicated by PCFICH. The PDCCH is configured of one or more CCEs. Each CCE includes 9 REGs, and each REG consists of 4 resource elements adjacent to one another while excluding a reference signal. A resource element corresponds to a minimum resource unit defined as 1 subcarrier×1 symbol. The PDCCH notifies information on resource assignment (or allocation) of transmitting channels PCH (Paging channel) and DL-SCH (Downlink-shared channel), Uplink Scheduling Grant, HARQ information, and so on to each user equipment (or user terminal) or user equipment group. The PCH (Paging channel) and the DL-SCH (Downlink-shared channel) are transmitted through the PDSCH. Information on which user equipment (one or a plurality of user equipments) data of the PDSCH are to be transmitted, and information on how the user equipments are to receive and decode the PDSCH data are included in the PDCCH, thereby being transmitted. For example, it is assumed that a specific PDCCH is processed with CRC masking with an RNTI (Radio Network Temporary Identity) "A" and that information on the data being transmitted is being transmitted through a specific subframe by using a radio (or wireless) resource (e.g., frequency position) "B" and a transmission formation information (e.g., transmission block size, modulation method, coding information, and so on) "C". A user equipment of the corresponding cell uses its own RNTI information to monitor the PDCCH, and a user equipment having the RNTI "A" receives the PDCCH. Then, by using the information on the received PDCCH, the PDSCH indicated by "B" and "C" is received.

Figure 4:
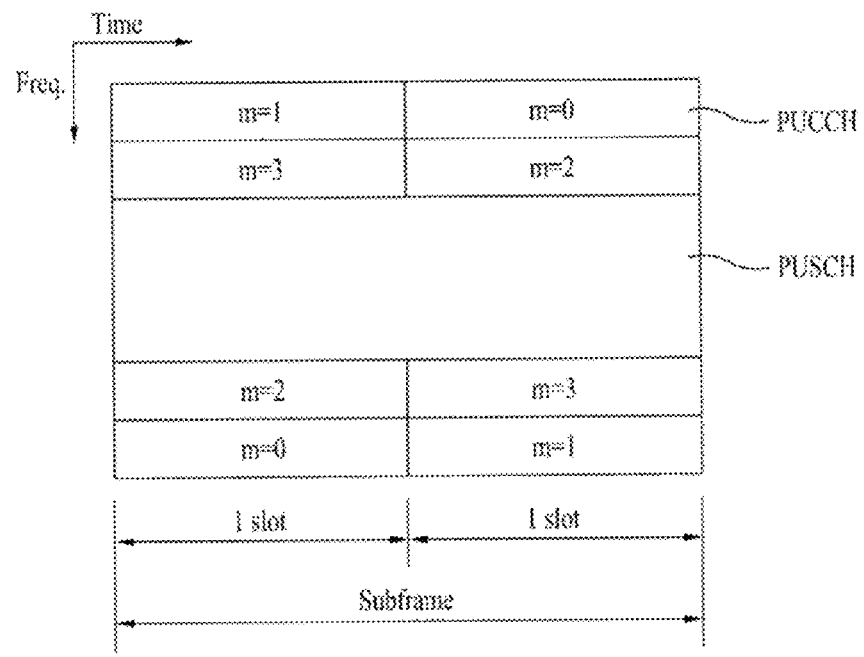
FIG. 4 illustrates an exemplary uplink subframe structure used in an LTE.

FIG. 4 is a diagram illustrating a structure of an uplink subframe used in an LTE system. Referring to FIG. 4, the uplink subframe includes a plurality of slots (for example, two slots). The slot can include a different number of SC-FDMA symbols depending on a CP length. For example, in case of a normal CP, the slot includes seven SC-FDMA symbols. The uplink subframe is divided into a data region and a control region. The data region includes a physical uplink shared channel (PUSCH), and is used to transmit a data signal such as voice. The control region includes a physical uplink control channel (PUCCH), and is used to transmit control information. The PUCCH includes a pair of resource blocks (RBs) (for example, m=0, 1, 2, 3) located at both ends of the data region on the frequency axis, and is hopped using the slot as a boundary. The control information includes HARQ ACK/NACK, channel quality indicator (CQI), precoding matrix index (PMI), and rank index (RI).

Figure 5:
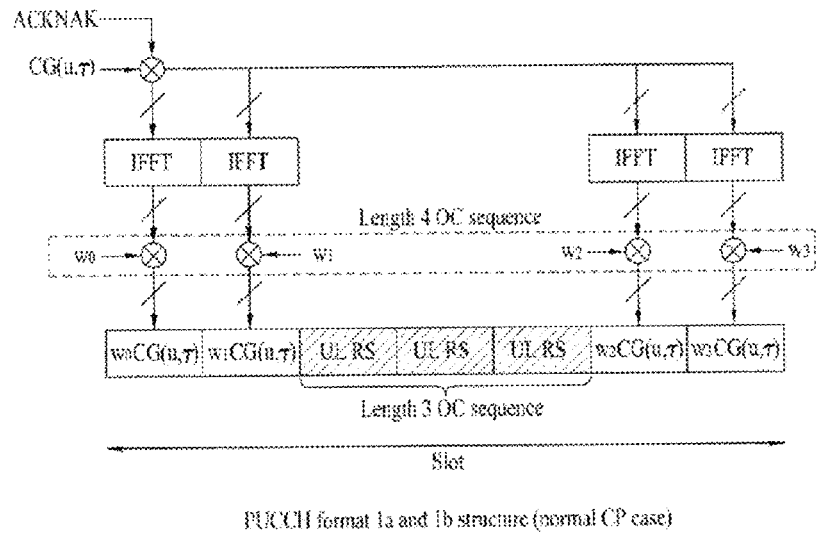
FIG. 5 illustrates an exemplary uplink control channel structure used in an LTE.

FIG. 5 is a diagram illustrating a structure of a physical uplink control channel (PUCCH) for transmitting ACK/NACK.

Referring to FIG. 5, in case of a normal cyclic prefix (CP), a reference signal (UL RS) is carried in three continuous symbols located in the center of the slot, and control information (i.e., ACK/NACK signals) is carried in the other four symbols. In case of an extended CP, the slot includes six symbols, wherein a reference signal is carried in the third and fourth symbols. ACK/NACK signals from a plurality of user equipments are multiplexed with one PUCCH resource by using a CDM mode. The CDM mode is implemented using cyclic shift (CS) of frequency spreading and/or (quasi) orthogonal spreading codes for time spreading. For example, ACK/NACK are identified using different cyclic shifts (CS) of computer generated constant amplitude zero auto correlation (CG-CAZAC) sequence (frequency spreading) and/or different walsh/DFT orthogonal codes (time spreading). w0, w1, w2, w3 multiplied after IFFT obtain the same result even though they are multiplied before IFFT. In the LTE system, PUCCH resources for transmitting ACK/NACK are expressed by combination of frequency-time resources (for example, resource block), cyclic shift of sequences for frequency spreading, and (quasi)orthogonal codes for time spreading. Each PUCCH resource is indicated using a PUCCH (resource) index.

Figure 6:
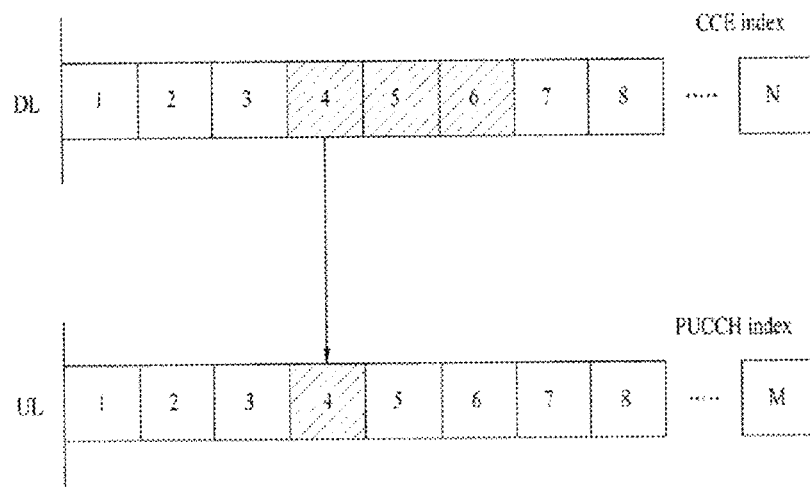
FIG. 6 illustrates an exemplary correspondence between a PUCCH and a PDCCH for transmitting ACK/NACK.

FIG. 6 is a diagram illustrating an example of determining PUCCH resources for ACK/NACK. In the LTE system, PUCCH resources for ACK/NACK are not previously allocated to each user equipment but shared by a plurality of user equipments within a cell per timing point. In more detail, the PUCCH resources used for ACK/NACK transmission correspond to PDCCH carrying scheduling information of corresponding downlink data. In each downlink subframe, an entire region where PDCCH(s) is transmitted includes a plurality of control channel elements (CCEs), and the PDCCH transmitted to the user equipment includes one or more CCEs. The user equipment transmits ACK/NACK through a PUCCH resource corresponding to a specific CCE (for example, first CCE) among CCEs constituting PDCCH received therein.

Referring to FIG. 6, each square block in a downlink (DL CC) represents a CCE, and each square block in an uplink (UL CC) represents a PUCCH resource. Each PUCCH index corresponds to a PUCCH resource for ACK/NACK. It is assumed that information regarding PDSCH information is transferred through a PDCCH that includes CCEs Nos. 4 to 6 as illustrated in FIG. 6. In this case, the user equipment transmits ACK/NACK through PUCCH No. 4 corresponding to CCE No. 4 which is the first CCE of the PDCCH. FIG. 6 illustrates that maximum M number of PUCCHs exist in the UL CC when maximum N number of CCEs exist in the DL CC. Although N may be equal to M (N=M), M may be different from N, and mapping between CCEs and PUCCHs may be overlapped.

In more detail, in the LTE system, PUCCH resource index is defined as follows.

$$n^{(1)}_{PUCCH} = n_{CCE} + N^{(1)}_{PUCCH}$$ [Equation 1]

In this case, $n^{(1)}_{PUCCH}$ represents a PUCCH resource index for transmitting ACK/NACK, $N^{(1)}_{PUCCH}$ represents a signaling value transferred from an upper layer, and $n_{CCE}$ represents the smallest value of CCE indexes used for PDCCH transmission.

Figure 7:
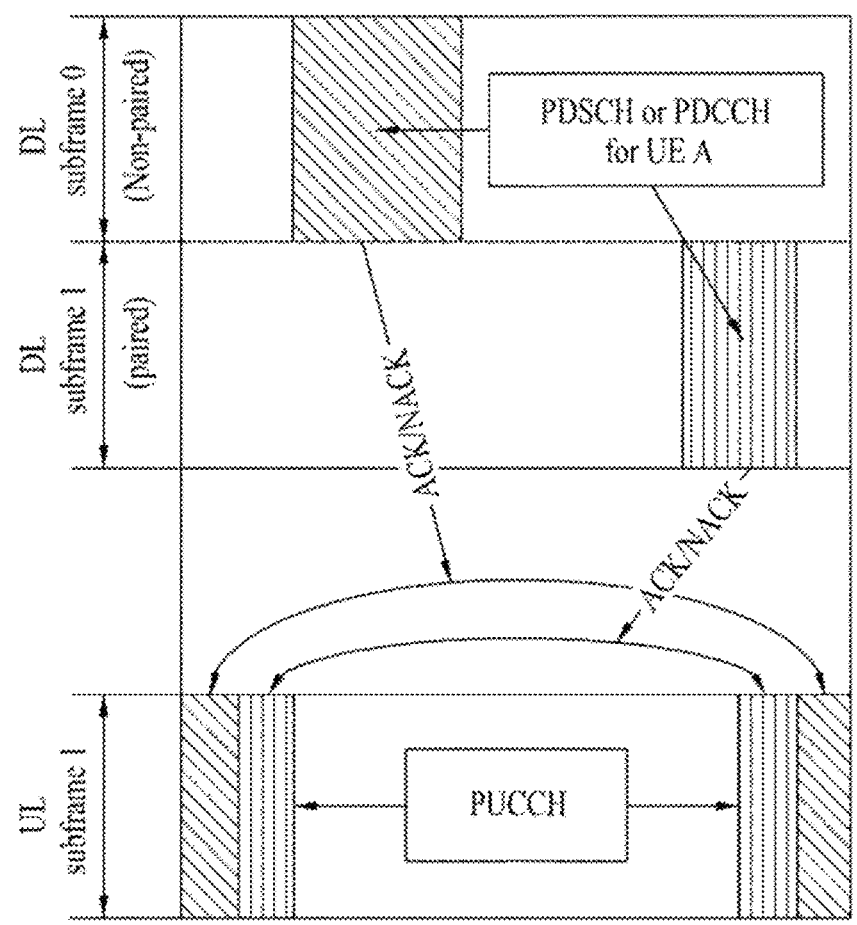
FIG. 7 illustrates an exemplary correspondence between a PUCCH and a PDCCH for transmitting ACK/NACK.
Figure 8:
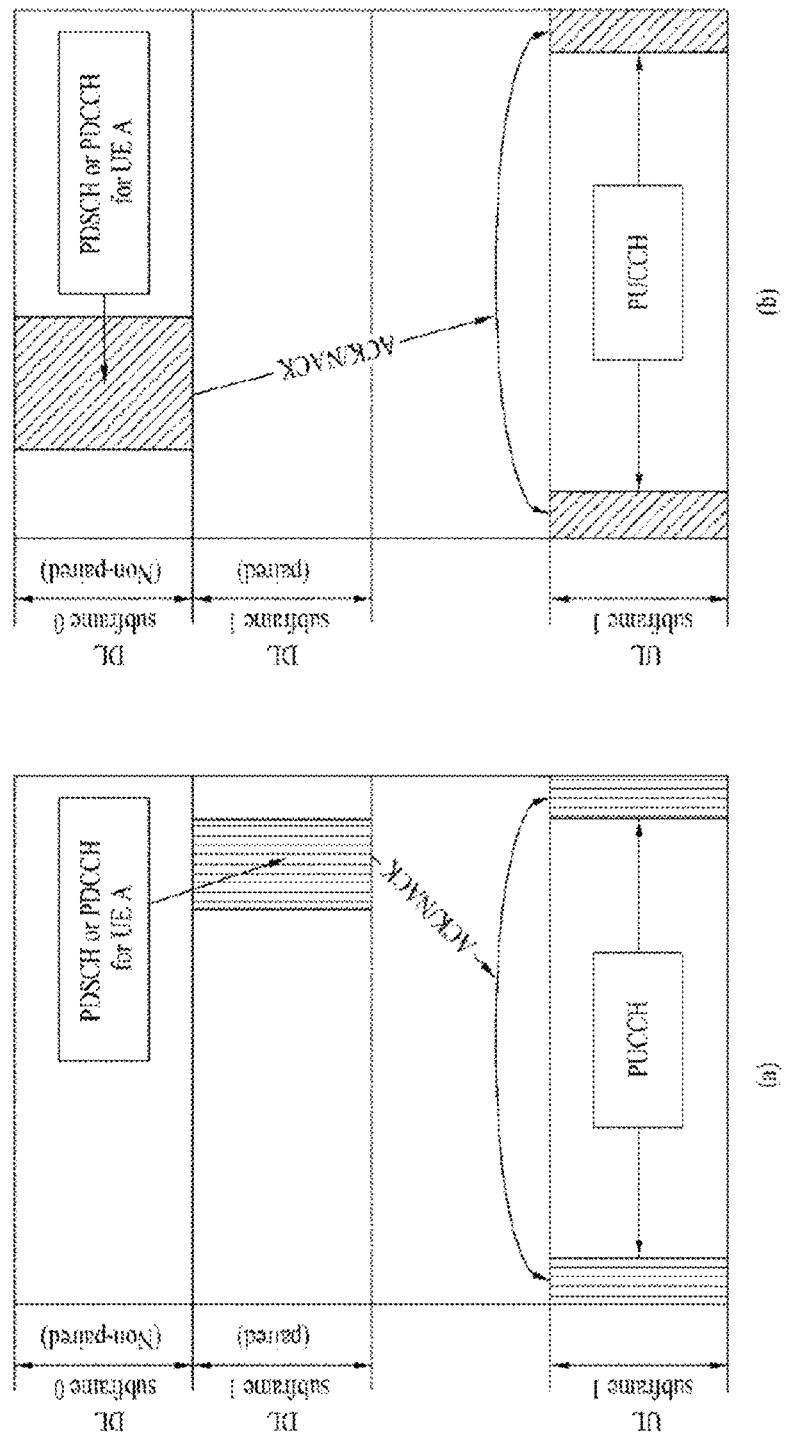
FIG. 8 and FIG. 9 illustrate examples of a user equipment transmitting ACK/NACK, when a non-paired subframe exists.
Figure 9:
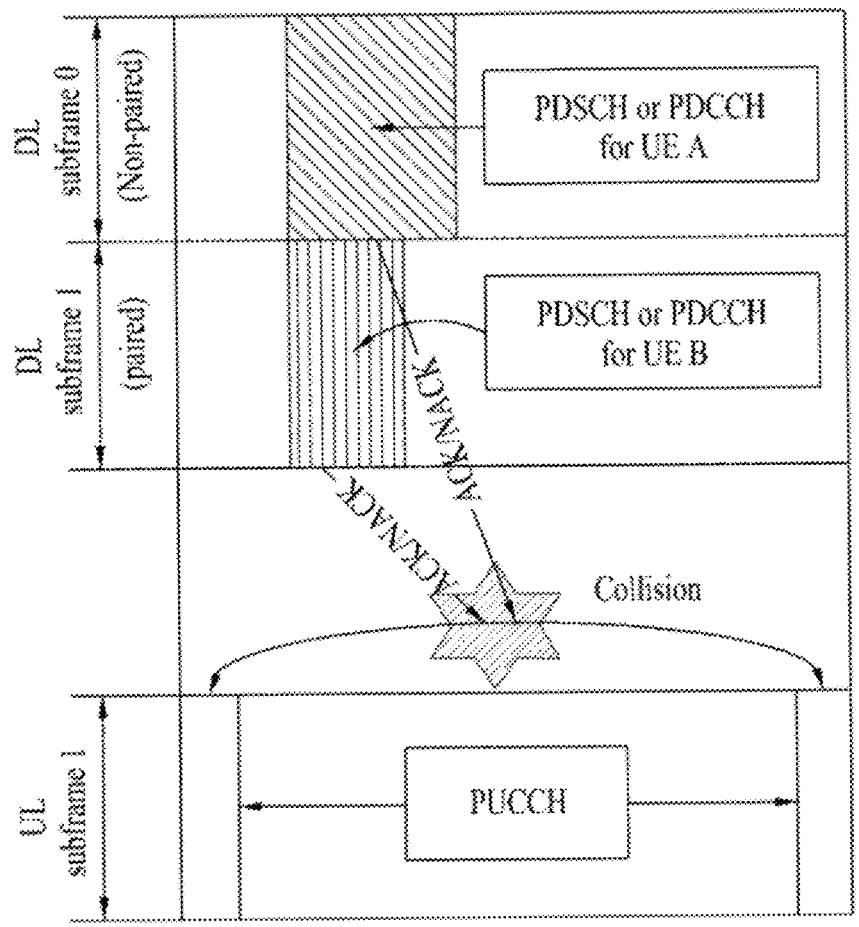

As shown in the equation 1, the PUCCH index for ACK/NACK transmission is decided according to the first CCE used for PDCCH transmission. And then, the RB (Resource Block) index, orthogonal cover index, and cyclic shift value of the PUCCH resource for the actual PUCCH transmission are decided according to the PUCCH index. eNB should reserve PUCCH resources that are equal to the number of CCEs for PDCCH transmission. In case that the number of CCEs for PDCCH transmission is more than 1, the remaining PUCCH indices which are mapped to remaining CCE indices except for the first CCE are not used for actual PUCCH transmission. As shown in Equation 1, the PUCCH index used for transmitting ACK/NACK is decided in accordance with a first CCE for PDCCH transmission. Thereafter, an RB (Resource Block) index for PUCCH transmission, an orthogonal cover index, and a cyclic shift value are decided by using the PUCCH index. Since the base station should reserve a number of PUCCH resources corresponding to the number of CCEs used in the PDCCH transmission, when two or more CCEs are used in the PDCCH transmission, with the exception of the first CCE, the PUCCH index mapped to the remaining PUCCH is not used for the PUCCH transmission. FIG. 7 to FIG. 9 illustrate examples of transmitting ACK/NACK. Generally, in an FDD (Frequency Division Duplex) system, the number of downlink subframes may be equal to the number of uplink subframes, and each number may correspond to one another. For example, in case of the LTE system, each downlink subframe has a paired uplink subframe in association with at least the PUCCH transmission for ACK/NACK signals. However, in case of the LTE-A system, a downlink subframe that does not have a paired uplink subframe in association with the PUCCH transmission may be generated in the FDD system and a TDD (Time Division Duplex) system.

For simplicity, in the present invention, a downlink subframe paired with an uplink subframe will be referred to as a paired subframe or a normal subframe. Also, a downlink subframe that is not paired with an uplink subframe will be referred to as a non-paired subframe or an extended subframe. A non-paired subframe may be generated for a variety of reasons. For example, a non-paired subframe may be generated when its respective uplink subframe, in the FDD or TDD mode, is used for another purpose (e.g., a backhaul link for a relay station). Also, a non-paired subframe may be generated when multiple downlink subframes in the TDD mode is linked to a single uplink subframe in association with the ACK/NACK signal transmission. In this case, one of the multiple downlink subframes may be assumed to be a paired subframe, and the remaining downlink subframes may be assumed to be non-paired subframes.

In case the user equipment receives multiple PDSCHs within multiple downlink subframes (i.e., a paired subframe and non-paired subframes), the assignment of multiple PUCCH resources should be taken into consideration in order to transmit multiple ACK/NACK through a single uplink subframe. For example, in case the user equipment receives 2 PDSCHs (and PDCCHs delivering (or carrying) scheduling information on the PDSCHs), it is assumed that one PDSCH exists in a non-paired subframe and that another PDSCH exists in a paired subframe. In this case, the user equipment shall ACK/NACK signals for its 2 respective PDSCHs through a single uplink subframe.

Referring to FIG. 7, since DL subframe 1 has a paired uplink subframe (UL subframe 1), DL subframe 0 is a non-paired subframe, and DL subframe 1 is a paired subframe. In the description of the present invention, the subframe index 'n' is used for referring to the paired UL/DL subframes. And, it should be noted that the subframe index 'n' is not used for indicating the subframe number in the time domain. As shown in FIG. 7, the 2 PDSCHs are respectively received through 2 downlink subframes. User equipment A (UE A) generates an ACK/NACK for a respective PDSCH within each downlink subframe. Then, 2 ACK/NACK signals for 2 downlink subframes should be transmitted through a single uplink subframe. In this case, user equipment A (UE A) should decide a PUCCH resource index for transmitting ACK/NACK signals. Meanwhile, if the same method of assigning (or allocating) a PUCCH resource (e.g., using the first CCE used in the PDCCH transmission) is applied, a collision may occur in the PUCCH resources for transmitting ACK/NACK. Therefore, a method of efficiently assigning (or allocating) PUCCH resources with respect to the paired subframe and the non-paired subframe should be defined.

For this, the PDSCH (and the PDCCH delivering (or carrying) scheduling information on the PDSCH) for UE A may be transmitted only to the paired subframe or the non-paired subframe (FIG. 8). However, even if UE A is set to receive the PDCCH for the PDSCH only in the non-paired subframe, another user equipment (UE B) may receive the PDCCH for the PDSCH through the paired subframe. In this case, if the first CCE of the PDCCH for UE A is identical to the first CCE of the PDCCH for UE B, the ACK/NACK signal for UE A may collide with the ACK/NACK signal for UE B (FIG. 9).

Figure 10:
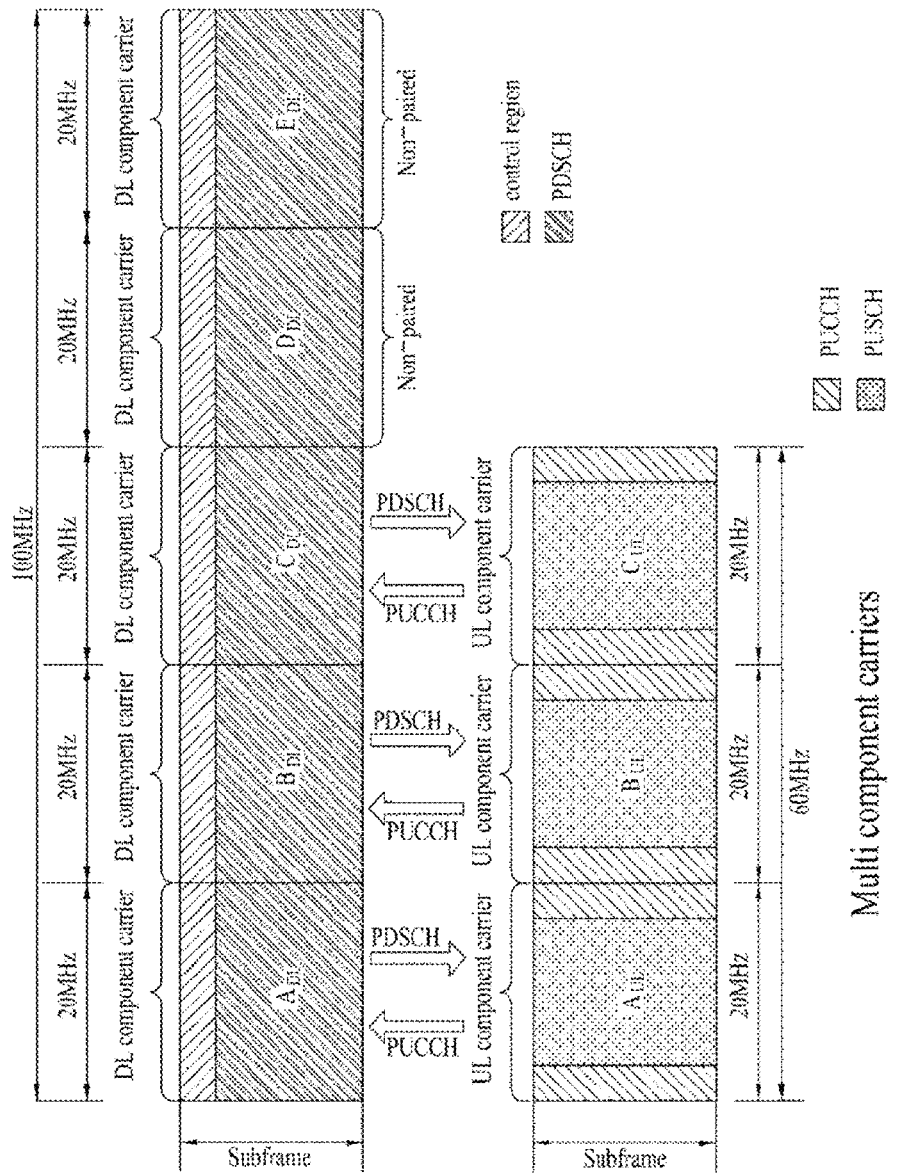
FIG. 10 illustrates an example of performing communication under a multiple component carrier condition.

FIG. 10 illustrates an example of performing communication under a multiple Component Carrier (CC) condition. The conditions of FIG. 7 to FIG. 9 may also be easily extended to a carrier aggregation (or bandwidth aggregation) condition by replacing the subframe with a component carrier.

Referring to FIG. 10, if the number of frequency bands used for downlink is greater than the number of frequency bands used for uplink, ACK/NACK information for multiple downlink PDSCH transmission should be transmitted through an uplink PUCCH, wherein the number of frequency bands is smaller. For example, the PUCCH for downlink component carriers D and E ($D_{DL}$ and $E_{DL}$) should be transmitted only through at least one of uplink component carriers A, B, and C ($A_{UL}$, $B_{UL}$, and $C_{UL}$). However, the uplink component carriers A, B, and C ($A_{UL}$, $B_{UL}$, and $C_{UL}$) may essentially be set to respectively transmit the PUCCH for the downlink component carriers A, B, and C ($A_{DL}$, $B_{DL}$, and $C_{DL}$). Therefore, at least one of the uplink component carriers A, B, and C ($A_{UL}$, $B_{UL}$, and $C_{UL}$) should further transmit the PUCCH for downlink component carriers D and E ($D_{DL}$ and $E_{DL}$).

Accordingly, as shown in FIG. 7 to FIG. 9, the downlink component carriers A, B, and C ($A_{DL}$, $B_{DL}$, and $C_{DL}$) may be referred to as paired component carriers, and the downlink component carriers D and E ($D_{DL}$ and $E_{DL}$) may be referred to as non-paired component carriers. However, in a carrier aggregation (or bandwidth aggregation) condition, the PDCCH and the PDSCH linked to the PDCCH may each be transmitted through a different DL CC. Therefore, the paired state may be defined based upon the DL CC through which the PDCCH is transmitted. Conversely, the paired state may also be defined based upon the DL CC through which the PDSCH is transmitted. Multiple data units may be simultaneously (e.g., during the same subframe) received in the FDD mode, and the multiple data units may also be respectively received at the same point or at different points through multiple subframes in the TDD mode.

Hereinafter, with reference to FIG. 11 to FIG. 15, diverse exemplary methods of transmitting ACK/NACK signals for multiple PDSCHs within multiple downlink subframes (or DL CCs) through a single uplink subframe (or UL CC) will be described. For simplicity of the description, a method for transmitting ACK/NACK signals for the PDSCHs within two downlink subframes (or DL CCs) through a single uplink subframe (or UL CC) will be given as an example.

For simplicity of the description, the description will be mostly focused on the case wherein multiple data units are being received through a paired DL subframe (or DL CC) and/or a non-paired DL subframe (or DL CC). However, this is merely exemplary, and, therefore, the description may similarly apply to a case wherein the user equipment transmits data units, which are received through at least three or more DL subframes (or DL CCs), through a single UL subframe (or UL CC).

Embodiment 1

Reservation of Additional Resource

Figure 11:
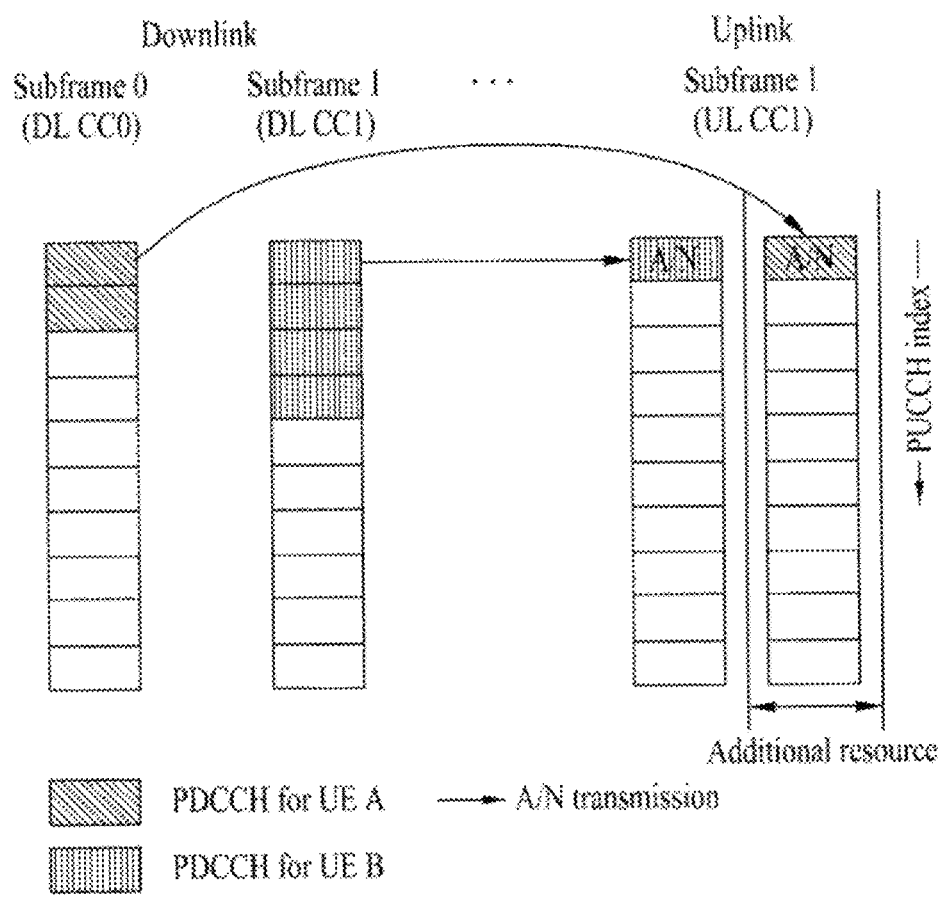
FIG. 11 illustrates an example of assigning (or allocating) resources for transmitting ACK/N ACK signals according to an embodiment of the present invention.

FIG. 11 illustrates an example of assigning (or allocating) resources for transmitting ACK/NACK signals according to an embodiment of the present invention. This embodiment of the present invention shows an example of a case wherein additional resource is reserved in the PUCCH resource region so as to be assigned to the PUCCH for ACK/NACK transmission. More specifically, when the user equipment receives multiple PDCCHs and the respective PDSCH, a PUCCH index may be decided from the already-reserved resource in accordance with the received subframe (or DL CC) through which the PDCCH (or PDSCH) is received. The additionally reserved PUCCH resource may be set so that the additionally reserved PUCCH resource does not overlap with the already-existing reserved PUCCH resource, or may be set so that the additionally reserved PUCCH resource can partially overlap with the already-existing reserved PUCCH resource. The additional resource may be explicitly indicated through an RRC message or L1/L2 control information, or the additional resource may be implicitly signaled from example from the type, index, and so on of the subframe (or DL CC). Although the additional resource will not be limited only to the above-described example, the additional resource may be reserved by applying an offset in Equation 1.

Referring to FIG. 11, the user equipment may decide the PUCCH index for the PDSCH received through the paired subframe (or DL subframe 1) by directly using a specific (e.g., first) CCE index used for PDCCH transmission. Meanwhile, the user equipment may decide the PUCCH index for the PDSCH received through the non-paired subframe (or DL subframe 0) from the additional resource by applying an offset to the specific (e.g., first) CCE index used for PDCCH transmission. This embodiment of the present invention may also be applied by setting a different value for the $N^{(1)}_{PUCCH}$ in Equation 1, instead of applying an offset to the CCE index.

Embodiment 2

Null PDCCH Transmission

Figure 12:
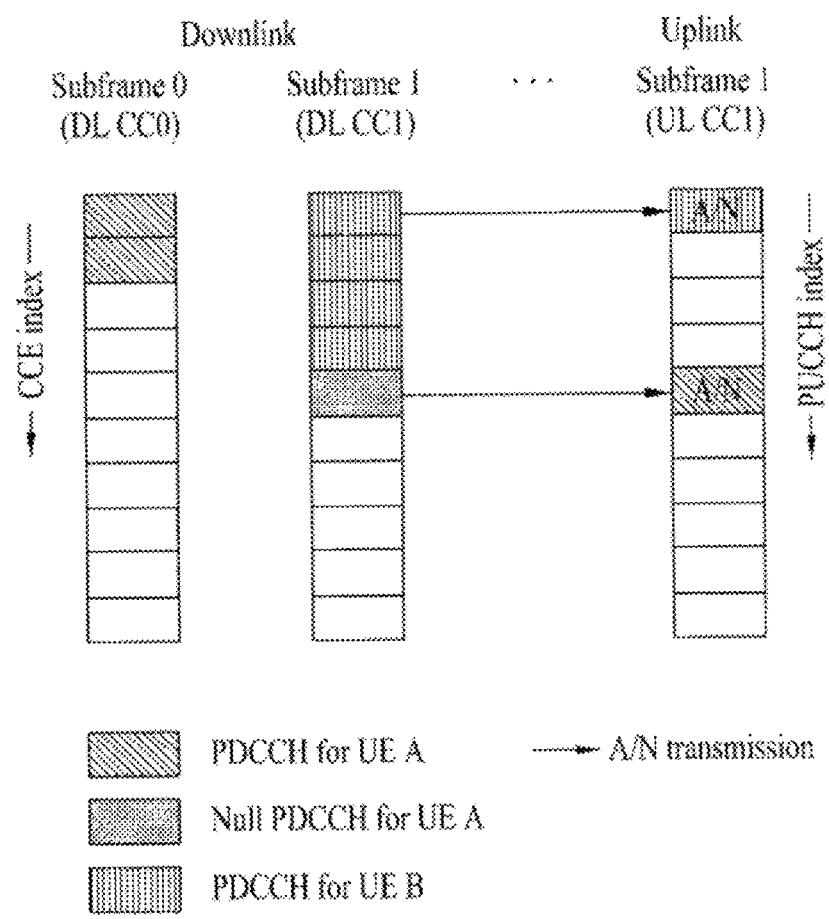
FIG. 12 illustrates an example of assigning (or allocating) resources for transmitting ACK/NACK signals according to another embodiment of the present invention.

FIG. 12 illustrates an example of deciding PUCCH resources for transmitting ACK/NACK signals according to another embodiment of the present invention. In this embodiment of the present invention, an example of transmitting a null PDCCH for a PUCCH assignment (or allocation) used for ACK/NACK transmission is given. Basically, in a UL subframe, a PUCCH resource is linked to a CCE index of a PDCCH being transmitted from a paired DL subframe. Therefore, when the user equipment receives a PDCCH through a non-paired DL subframe, a PDCCH for assigning PUCCH resources may be separately defined. Herein, the PDCCH is transmitted through a paired DL subframe for PUCCH resource assignment (or allocation). For simplicity, the PDCCH for assigning PUCCH resources will be referred to as a null PDCCH. More specifically, the null PDCCH corresponds to a PDCCH being transmitted through a paired DL subframe for a non-paired DL subframe, and the null PDCCH provides a CCE index for PUCCH resource assignment (or allocation). The null PDCCH may be identified by using contents of control information (e.g., null (e.g., pre-defined '0's or '1's) value, pre-decided specific value, etc.), a structure of the control information (e.g., DCI format, length, etc.), an RNTI (Radio Network Temporary Identity) for CRC (Cyclic Redundancy Check) masking, a code for scrambling, and so on. The null PDCCH may be configured of a small number of CCEs, and, characteristically, the null PDCCH may be configured of 1 CCE. When the user equipment receives a plurality of non-paired subframes, a plurality of null PDCCHs may have to be received accordingly. In this case, each null PDCCH should be connected to the respective non-paired subframe. For this, the null PDCCH may include non-paired subframe identification information. The non-paired subframe identification information may be directly included in control information (e.g., DCI) of the null PDCCH, or may be indirectly indicated by using a masking/scrambling code. Also, each null PDCCH may be automatically linked to a respective non-paired subframe taking into consideration of the null PDCCH order (e.g., number of CCEs, position of a specific (e.g., first) CCE within the frequency). Moreover, when a user equipment receives a plurality of non-paired subframes, PUCCH resources allocated to the user equipment may be indicated by each CCE index in a single null PDCCH consisting of a plurality CCEs. Moreover, when a user equipment receives a plurality of non-paired subframes, PUCCH resources may be allocated by using PUCCH resource allocation information in one null PDCCH.

Referring to FIG. 12, UE A receives a PDSCH (and a PDCCH delivering (or carrying) scheduling information on the PDSCH) in a non-paired DL subframe (DL subframe 0). In this case, the base station transmits a null PDCCH to UE A through a paired DL subframe (DL subframe 1). After receiving the null PDCCH, the user equipment identifies a PUCCH resource for ACK/NACK transmission by considering the null PDCCH, preferably by considering a resource index related to the null PDCCH. For example, in this case, the user equipment may use a PUCCH index, which is linked to a specific (e.g., first) CCE of the null PDCCH, so as to transmit the ACK/NACK signal for the PDSCH to the base station, wherein the PDSCH is received in DL subframe 0. Meanwhile, UE B receives a PDCCH and its respective PDSCH through DL subframe 1 and transmits an ACK/NACK signal to the base station through a PUCCH resource, which is linked to a specific (e.g., first) CCE of the PDCCH.

Embodiment 3

Signaling Additional Information

Figure 13:
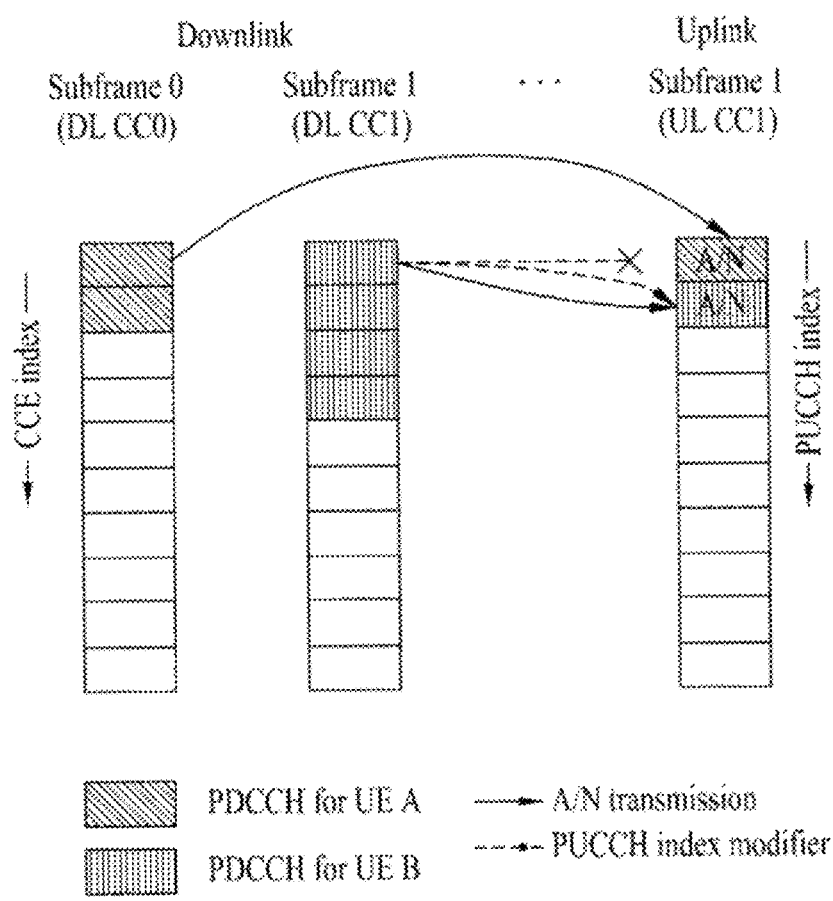
FIG. 13 and FIG. 14 respective illustrate examples of assigning (or allocating) resources for transmitting ACK/NACK signals according to yet another embodiment of the present invention.
Figure 14:
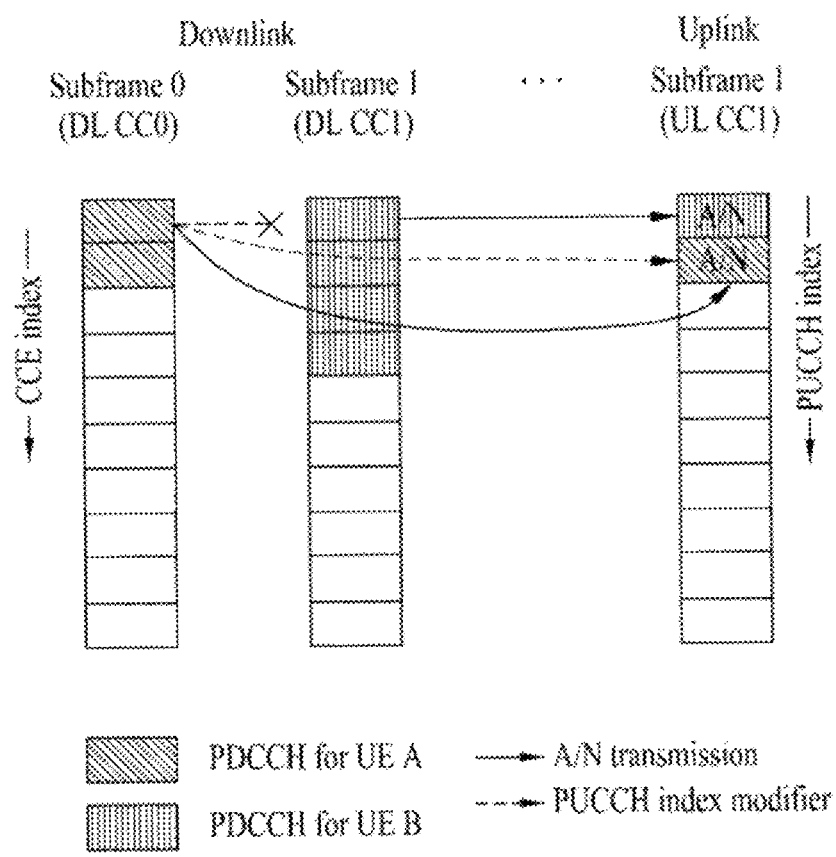

FIG. 13 and FIG. 14 respective illustrate examples of deciding resources for transmitting ACK/NACK signals according to yet another embodiment of the present invention. In this embodiment of the present invention, an example of signaling additional information for assigning (or allocating) a PUCCH index is given. Regardless of the subframe type, it is assumed in this embodiment of the present invention that the PUCCH is linked with a specific (e.g., first) CCE of corresponding all PDCCHs regardless of subframe type. In this case, when multiple subframes are received through multiple PDCCHs, specific (e.g., first) CCE indexes of the PDCCH may overlap. Therefore, in order to prevent collision between PUCCH resources due to the overlapping CCEs, additional information for changing the mapping between the CCE index and the PUCCH index may be signaled. In this embodiment of the present invention, the additional information will be simply referred to as index modification information. For example, the index modification information may be an absolute or relative offset for the PUCCH index. In this case, the offset may be applied by being added in Equation 1. The index modification information may be signaled through the PDCCH. In this case, the index modification information may be transmitted through the PDCCH of a paired subframe, or may be transmitted through the PDCCH of a non-paired subframe. Also, regardless of the subframe, the index modification information may be transmitted through the PDCCH of both non-pd/non-paired subframes. The index modification information may be explicitly or implicitly signaled. For example, the index modification information may be directly included in the control information of the PDCCH, or may be indirectly indicated by using a masking/scrambling code. Furthermore, the PDCCH indicates only an on/off state on whether or not the index should be modified, and the index modifying information may be pre-defined or indirectly identified by taking into account of subframe type/index, duplex mode, CC index, and so on. For example, when a PDCCH is received through a non-paired subframe, an index of the non-paired subframe or a value associated therewith may be used as the index modification information (e.g., offset). For another example, when a PDCCH is received through a non-paired subframe, an index difference between the non-paired subframe and the paired subframe or a value associated therewith may be used as the index modification information (e.g., offset). If the PDCCH is received through a non-paired CC, the index modification information may be identified in a similar manner.

FIG. 13 assumes a case wherein the index modification information is signaled through the PDCCH of a paired subframe. Referring to FIG. 13, in order to avoid PUCCH collision between UE A and UE B, additional information is signaled to UE B. When it is assumed that an index offset is signaled to UE B from the base station, UE B adds the received offset value to the PUCCH index, which is linked to the specific (e.g., first) CCE of the PDCCH received in DL subframe 1, thereby deciding the final PUCCH index. Meanwhile, UE A uses the PUCCH index, which is linked to the specific (e.g., first) CCE of the PDCCH received in DL subframe 0, so as to transmit an ACK/NACK signal. Therefore, even if the first CCE index of the PDCCH for UE A is identical to the first CCE index of the PDCCH for UE B, PUCCH collision may be prevented.

FIG. 14 assumes a case wherein the index modification information is signaled through the PDCCH of a non-paired subframe, Referring to FIG. 14, in order to avoid PUCCH collision between UE A and UE B, additional information is signaled to UE A. When it is assumed that an index offset is signaled to UE A from the base station, UE B adds the received offset value to the PUCCH index, which is linked to the specific (e.g., first) CCE of the PDCCH received in DL subframe 0, thereby deciding the final PUCCH index. Meanwhile, UE B uses the PUCCH index, which is linked to the specific (e.g., first) CCE of the PDCCH received in DL subframe 1, so as to transmit an ACK/NACK signal. Therefore, even if the first CCE index of the PDCCH for UE A is identical to the first CCE index of the PDCCH for UE B, PUCCH collision may be prevented.

Embodiment 4

Indexing Based Upon a CCE Subsequent to the First CCE

Figure 15:
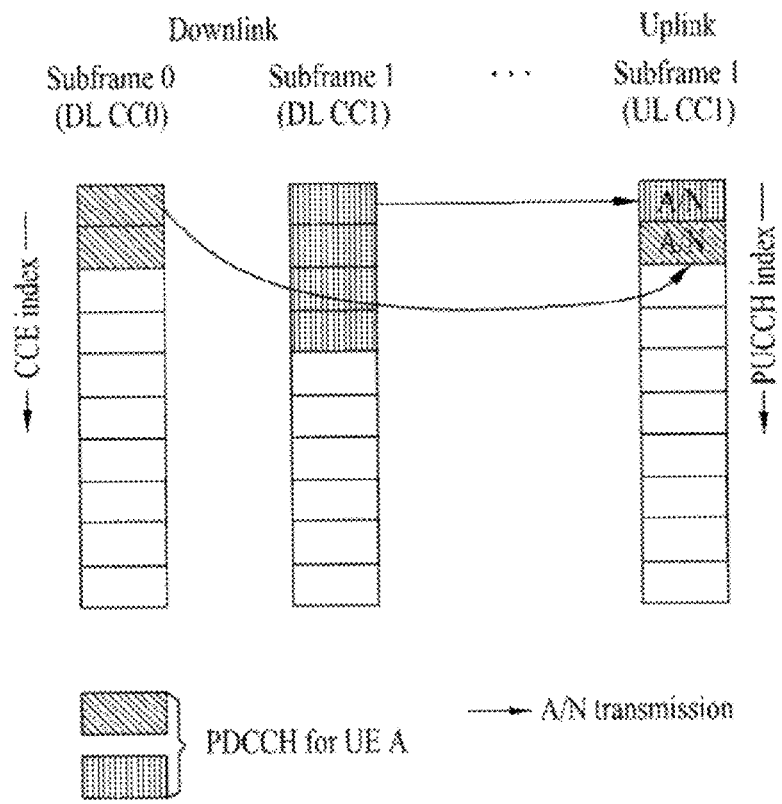
FIG. 15 illustrates an example of assigning (or allocating) resources for transmitting ACK/NACK signals according to yet another embodiment of the present invention.

FIG. 15 illustrates an example of deciding resources for transmitting ACK/NACK signals according to yet another embodiment of the present invention. In this embodiment of the present invention, an example of deciding a PUCCH index based upon a CCE index subsequent to the first CCE of the PDCCH for PDSCH-scheduling is given. In the LTE system, when two or more CCEs are used for PDCCH transmission, the PUCCH indexes mapped to the remaining CCEs excluding the first CCE are not used for PUCCH transmission. More specifically, the base station reserves a number of PUCCH resources corresponding to the number of CCEs used for PDCCH transmission. Therefore, when the user equipment decides PUCCH resources based upon the CCE index subsequent to the first CCE index, collision between the ACK/NACK signals may be prevented.

Referring to FIG. 15, the PUCCH index for a paired DL subframe (DL subframe 1) is decided by the first CCE index used in the corresponding PDCCH transmission. Conversely, the PUCCH index for a non-paired DL subframe (DL subframe 0) is decided by a CCE subsequent to the first CCE index used in the corresponding PDCCH transmission, preferably PDCCH transmission of the paired DL subframe. Therefore, additional signaling is not required for resource assignment (or allocation). Meanwhile, when two or more CCEs are consecutively assigned for the PDSCH transmission, the index subsequent to the first CCE index will become the second index for the PDCCH transmission. In this case, since multiple PUCCH indexes have already been exclusively reserved based upon the CCEs assigned for the PDCCH transmission, collision between identical/different user equipments may be automatically prevented. Meanwhile, when the PDCCH, which is transmitted through a (non-)paired subframe, is configured of a single CCE, a collision may occur between the PUCCH indexes of identical/different user equipments. If a single CCE is assigned for PDCCH transmission of UE A, in order to prevent collision with other user equipment, the base station should perform scheduling so that a PDCCH (particularly the first CCE of the PDCCH) of another user equipment would not be transmitted using a CCE subsequent to the first CCE for the PDCCH of UE A.

In this embodiment of the present invention, when the user equipment requires N(>2) PUCCH resources, expansion may be simply performed without any additional signaling. More specifically, additional (N−1) PUCCH indexes may be consecutively assigned in accordance with a series of consecutive (N−1) CCE indexes subsequent to the first CCE index.

As shown in FIG. 11 to FIG. 15, UE A and UE B may correspond to the same user equipment or may each correspond to a different user equipment. If UE A and UE B correspond to the same user equipment, the user equipment transmits ACK/NACK signals for multiple data units, which are received through multiple downlink subframes (or DL CCs), to the base station (or relay station) through linked PUCCH resources. In this case, the user equipment may individually transmit an ACK/NACK signal for each of the multiple data units through a respective PUCCH resource. Furthermore, instead of using all of the multiple PUCCH resources, a bundled or multiplexed ACK/NACK signal may be transmitted through one or more selected PUCCH resources.

In the embodiment of the present invention, at least part of the embodiment may be easily applied for a different purpose (e.g., additional PUCCH assignment for transmission diversity). For example, the paired subframe shown in the example according to the embodiment of the present invention may be re-interpreted as one of multiple transmission antennae. And, the non-paired subframe may be re-interpreted as the remaining transmission antennae. In this case, in order to ensure additional PUCCH resources for the remaining transmission antennae, the PUCCH index may be changed by using a similar method as shown in the example according to the embodiment of the present invention.

Figure 16:
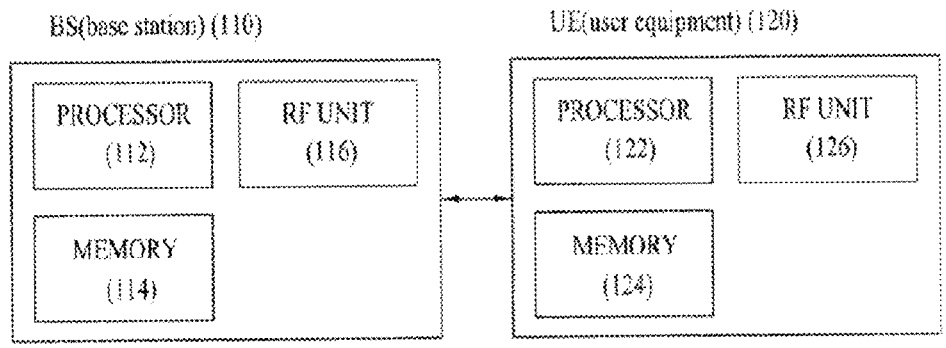
FIG. 16 illustrates an exemplary base station and an exemplary user equipment (or user terminal) that can be applied to the embodiment of the present invention.

FIG. 16 is a diagram illustrating a base station and a user equipment that can be applied to one embodiment of the present invention.

Referring to FIG. 16, the wireless communication system includes a base station (BS) 110 and a user equipment (UE) 120. In the downlink, the transmitter is a part of the base station 110 and the receiver is a part of the user equipment 120. In the uplink, the transmitter is a part of the user equipment 120 and the receiver is a part of the base station 110. The base station 110 includes a processor 112, a memory 114, and a radio frequency (RF) unit 116. The processor 112 can be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 can be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 can have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The present invention may be applied in a wireless communication system. More specifically, the present invention may be applied to a method and apparatus of transmitting ACK/NACK.

What is claimed is:

1. A method for transmitting an uplink signal by a user equipment (UE) in a wireless communication system, the method comprising:
   receiving, by the UE, a physical downlink control channel (PDCCH) via one or more resource units;
   receiving, by the UE, a physical downlink shared channel (PDSCH) indicated by the received PDCCH; and
   transmitting, by the UE, a physical uplink control channel (PUCCH) using a PUCCH resource in response to the received PDSCH,
   wherein an index of the PUCCH resource is determined by adding a first index offset and a second index offset to a lowest index of the one or more resource units, and
   wherein the first index offset is signaled via the PDCCH and the second index offset is signaled via higher layer signaling.

2. The method of claim 1, wherein the PDSCH carries a downlink data signal and the PUCCH carries an acknowledgement/negative-acknowledgement (ACK/NACK) signal for the downlink data signal.

3. The method of claim 1, wherein the first index offset is signaled through downlink control information (DCI) which is carried by the PDCCH.

4. The method of claim 1, wherein each of the one or more resource units corresponds to a control channel element (CCE).

5. The method of claim 4, wherein the lowest index corresponds to a lowest CCE index used to construct the PDCCH.

6. The method of claim 1, wherein the second index offset is signaled through an RRC message.

7. A user equipment (UE) configured to transmit an uplink signal in a wireless communication system, the UE comprising:
   a radio frequency (RF) unit; and
   a processor configured to:
      receive a physical downlink control channel (PDCCH) via one or more resource units,
      receive a physical downlink shared channel (PDSCH) indicated by the received PDCCH, and
      transmit a physical uplink control channel (PUCCH) using a PUCCH resource in response to the received PDSCH,
   wherein an index of the PUCCH resource is determined by adding a first index offset and a second index offset to a lowest index of the one or more resource units, and
   wherein the first index offset is signaled via the PDCCH and the second index offset is signaled via higher layer signaling.

8. The UE of claim 7, wherein the PDSCH carries a downlink data signal and the PUCCH carries an acknowledgement/negative-acknowledgement (ACK/NACK) signal for the downlink data signal.

9. The UE of claim 7, wherein the first index offset is signaled through downlink control information (DCI) which is carried by the PDCCH.

10. The UE of claim 7, wherein each of the one or more resource units corresponds to a control channel element (CCE).

11. The UE of claim 10, wherein the lowest index corresponds to a lowest CCE index used to construct the PDCCH.

12. The UE of claim 7, wherein the second index offset is signaled through an RRC message.

* * * * *